(12) United States Patent
Moretto

(10) Patent No.: US 7,888,810 B2
(45) Date of Patent: Feb. 15, 2011

(54) WIND TURBINE GENERATOR SYSTEM

(76) Inventor: Jose Paul Francois Moretto, 5403 Biloxi St., San Diego, CA (US) 92105

( * ) Notice: Subject to any disclaimer, the term of this patent is extended or adjusted under 35 U.S.C. 154(b) by 0 days.

(21) Appl. No.: 12/591,550

(22) Filed: Nov. 23, 2009

(65) Prior Publication Data

US 2010/0127497 A1 May 27, 2010

Related U.S. Application Data

(60) Provisional application No. 61/199,861, filed on Nov. 21, 2008.

(51) Int. Cl.
*F03D 9/00* (2006.01)
*H02P 9/04* (2006.01)
(52) U.S. Cl. .................................... 290/44
(58) Field of Classification Search ............... 290/43, 290/44, 54, 55; 415/2.1, 4.1, 4.2, 4.3, 4.5, 415/3.1; 416/132 B, DIG. 4
See application file for complete search history.

(56) References Cited

U.S. PATENT DOCUMENTS

| | | | | |
|---|---|---|---|---|
| 2,403,564 A | * | 7/1946 | Stein ........................... | 290/44 |
| 2,653,250 A | * | 9/1953 | Romani ...................... | 290/4 C |
| 3,883,750 A | * | 5/1975 | Uzzell, Jr. ................... | 290/55 |
| 4,039,848 A | * | 8/1977 | Winderl ...................... | 290/55 |
| 4,061,926 A | | 12/1977 | Peed | |
| 4,087,196 A | * | 5/1978 | Kronmiller ................. | 415/4.5 |
| 4,140,433 A | * | 2/1979 | Eckel ...................... | 415/209.1 |
| 6,172,429 B1 | | 1/2001 | Russell | |
| 6,215,199 B1 | | 4/2001 | Lysenko et al. | |
| 6,246,126 B1 | * | 6/2001 | Van Der Veken et al. ...... | 290/55 |
| 6,492,743 B1 | | 12/2002 | Appa | |
| 6,932,561 B2 | * | 8/2005 | Yoo ........................... | 415/4.3 |
| 6,945,747 B1 | | 9/2005 | Miller | |
| 7,116,006 B2 | | 10/2006 | McCoin | |
| 7,400,057 B2 | | 7/2008 | Sureshan | |
| 7,592,711 B1 | * | 9/2009 | Lee ............................. | 290/44 |
| 7,728,455 B2 | * | 6/2010 | Branco ....................... | 290/55 |
| 2003/0049128 A1 | | 3/2003 | Rogan | |
| 2008/0159873 A1 | | 7/2008 | Tran | |
| 2008/0258473 A1 | | 10/2008 | McMaster | |
| 2009/0001724 A1 | | 1/2009 | Lee et al. | |
| 2010/0181775 A1 | * | 7/2010 | Yu ............................. | 290/55 |
| 2010/0225118 A1 | * | 9/2010 | Micu .......................... | 290/55 |

* cited by examiner

*Primary Examiner*—Julio Gonzalez

(57) ABSTRACT

The wind turbine generator system utilizes environmental wind to produce electricity through wind-driven rotation of a turbine generator. The system includes a housing having upper and lower portions and a main open cover mounted thereon. The main open cover is configured to direct wind through an opening formed through the upper portion and into an interior thereof. A main turbine is rotatably mounted within the upper portion, with the environmental wind directed by the main open cover driving rotation thereof. The main turbine has a central aperture formed therethrough, with rotation of the main turbine driving air flow downwardly therethrough. A secondary turbine is rotatably mounted in the lower portion of the housing, with the secondary turbine being driven to rotate by the downwardly driven air generated by the main turbine. The secondary turbine partially drives rotation of the main turbine. An electrical generator is linked to the main turbine.

20 Claims, 2 Drawing Sheets

WIND TURBINE GENERATOR SYSTEM

CROSS-REFERENCE TO RELATED APPLICATION

This application claims the benefit of U.S. Provisional Patent Application Ser. No. 61/199,861, filed Nov. 21, 2008.

BACKGROUND OF THE INVENTION

1. Field of the Invention

The present invention relates to devices for generating electricity, and particularly to a wind turbine generator system for generating electricity by wind power.

2. Description of the Related Art

Wind power has provided a local source of energy for centuries. In the United States, the invention of the mechanical windmill in the 19th century allowed the settlement of much of the American frontier and still remains a localized source of power for farms and ranches. Beginning in the 1920's, rural families used small wind turbine electric generators to power their homes. Following the enactment of the Rural Electrification Act in the 1930's, and the creation of rural electric cooperatives for bringing dependable electric power to rural areas, governmental policies favored the design and construction of large centralized, primarily fossil-fueled fired, electric generation facilities which distributed electric power to rural areas over a large transmission and distribution grid.

These governmental policies effectively crippled the market for small wind turbine electric power generation in the United States until the oil crisis in the late 1970's. For approximately ten years following the passage of environmental laws in the late 1970's, tax credits and favorable federal regulations created a new market for small wind powered electric generation systems for rural homes, farms and ranches. When the tax credits ceased to be available and the price of oil declined in the late 1980's, small wind turbine businesses were again driven out of business.

The demand for electric power continues unabated. As a result of the rapid increase in oil and natural gas prices since the late 1990's, the growing awareness that emissions from fossil-fuel sources is the likely cause of global warming, and the need for energy independence for national security reasons, there has been an increased demand for cost-effective electric power generated from renewable resources, such as wind and solar.

In response to this demand, along with innovations in wind turbine design and efficiency, large utility-scale wind turbine electric generator farms (commonly referred to as "big wind") have been constructed in remote areas of the country with high wind potential. This increasingly competitive source of energy is steadily providing a growing share of U.S. electricity without consuming any natural resource or emitting any pollution or greenhouse gases. Wind energy generation is growing rapidly throughout the U.S. Wind energy has been growing 29% annually from 2002 to 2007 and the installed wind energy generating capacity is now over 20,000 MW (estimated by the end of 2008). Wind power currently supplies 1% of the nation's electricity, but is estimated to be capable of providing as much as 20% by 2020.

When most Americans think of wind power, they think of "big wind". Big wind power is generated by utility scale turbines. Many of these wind turbines have blades over 40 meters wide, meaning the diameter of the rotor is over 80 meters (nearly the length of a football field), mounted on towers 80 meters tall. These types of turbines can produce 1.8 Megawatts (MW) of power. The current wind farm model is to place a large number of these utility scale wind turbines in one central location.

Such "big wind" farms, however, have disadvantages. The wind turbines are very expensive and must also be located in areas of high wind potential. Land for the wind farm has to be purchased or leased. In addition, the big wind developer has to purchase transmission line easements from the wind farm to the existing transmission power grid. As a result, the development time is long and costs are very high. Because of these restrictions, many new big wind farms cannot be built for six to ten years.

In addition, such big wind farms are typically located remotely from the large urban areas experiencing the most rapid growth in the demand for electricity. The transmission of such big wind-generated electric power over long distances has taxed the existing transmission grid to its limits, thereby adding to the nation's already most pressing energy and electric power problems, including blackouts and brownouts, energy security concerns, power quality issues, tighter emissions standards, transmission bottlenecks, and the desire for greater control over energy costs.

These transmission grid problems have constrained the development of big wind farms until either developers or governmental entities build new transmission capacity over long distances. This will require both huge capital investment and very long development cycles because of the need to purchase additional "rights-of-way" or easements for the new transmission lines. Such delays and capital investment substantially increase the per KWH costs of energy to the consumer, thereby making "big wind" generated electric power more expensive.

Smaller scale wind generation is also known and is typically also based on turbine driven power. However, typical wind driven turbines are relatively inefficient, often only converting a small fraction of the wind's kinetic energy into usable electrical power, and also only being effective when the wind is blowing in one particular direction within a small range of desirable speeds.

Thus, a wind turbine generator system solving the aforementioned problems is desired.

SUMMARY OF THE INVENTION

The wind turbine generator system utilizes environmental wind to produce electricity through wind-driven rotation of a turbine generator. The wind turbine generator system includes a housing having upper and lower portions, and a main open cover mounted on the upper portion of the housing. The main open cover is configured to direct environmental wind through an opening formed through the upper portion of the housing and into an interior region of the upper portion.

A main turbine is rotatably mounted within the upper portion of the housing and is driven to rotate by wind directed to the turbine by the main open cover. The main turbine has a central aperture formed therethrough. Rotation of the main turbine drives airflow downward through the central aperture. A lower rotor is mounted to a lower surface of the main turbine. A central passage is formed through the lower rotor for directing airflow through the lower rotor.

A secondary turbine is rotatably mounted in the lower portion of the housing. The secondary turbine is driven to rotate by the downwardly driven air generated by the main turbine. An upper rotor is mounted on the secondary turbine. The upper rotor partially drives rotation of the lower rotor. An electrical generator is linked to the main turbine for generating electricity due to the rotation thereof.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
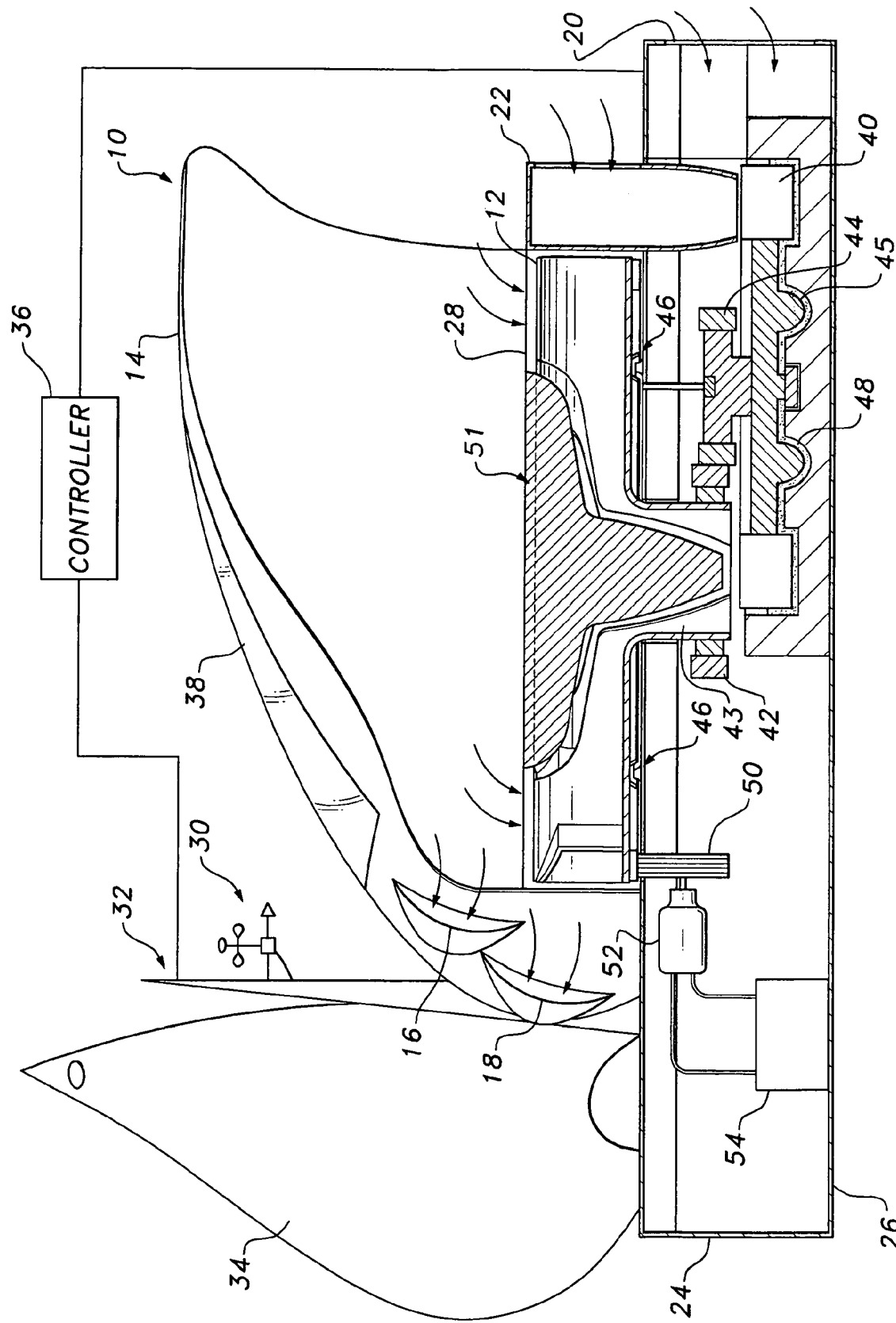
FIG. 1 is a diagrammatic view of a wind turbine generator system according to the present invention.

Referring to FIG. 1, the wind turbine generator system 10 includes a housing 24 provided for a main turbine 12 and a secondary turbine 40. The housing 24 may be adapted for mounting on the ground or, alternatively, may be adapted for mounting on a separate support, allowing for positioning of system 10 above ground level or at sea. It should be understood that FIG. 1 is diagrammatic and is shown for exemplary purposes only. Housing 24 may have any desired dimensions and configuration.

A main open cover 14 is positioned on an upper surface of an upper portion 28 of housing 24, the cover 14 directing wind (as indicated by the directional arrows in FIG. 1) into the upper portion 28 of housing 24. The main open cover 14 may have any desired configuration or dimensions, and may further include separate side portions 16, 18, allowing for collection and direction of wind from multiple directions at once.

Preferably, the main open cover 14, along with portions 16, 18, is rotatable with respect to the upper portion 28 of the housing 24, allowing for collection of wind from any direction. Main open cover 14 may rotate under the power of the wind alone, similar to a conventional weathervane, or may be separately controlled. Preferably, an anemometer 30 or the like is mounted on a wavelength antenna 32, as shown, with the anemometer delivering signals to a controller 36, including measured wind speed, direction and air pressure. The controller 36, which may be any suitable type of controller, such as a programmable logic controller, a computer or the like, may then deliver control signals to a separate motorized system for rotating the main open cover 14 and portions 16, 18, allowing for maximization of air input into the housing 24 for driving the main turbine 12. It should be understood that any suitable type of control and drive system may be utilized. A separate stabilizing rudder 34 may also be mounted on the lower portion 26 of housing 24, allowing for further directional control of airflow into the system.

Figure 2:
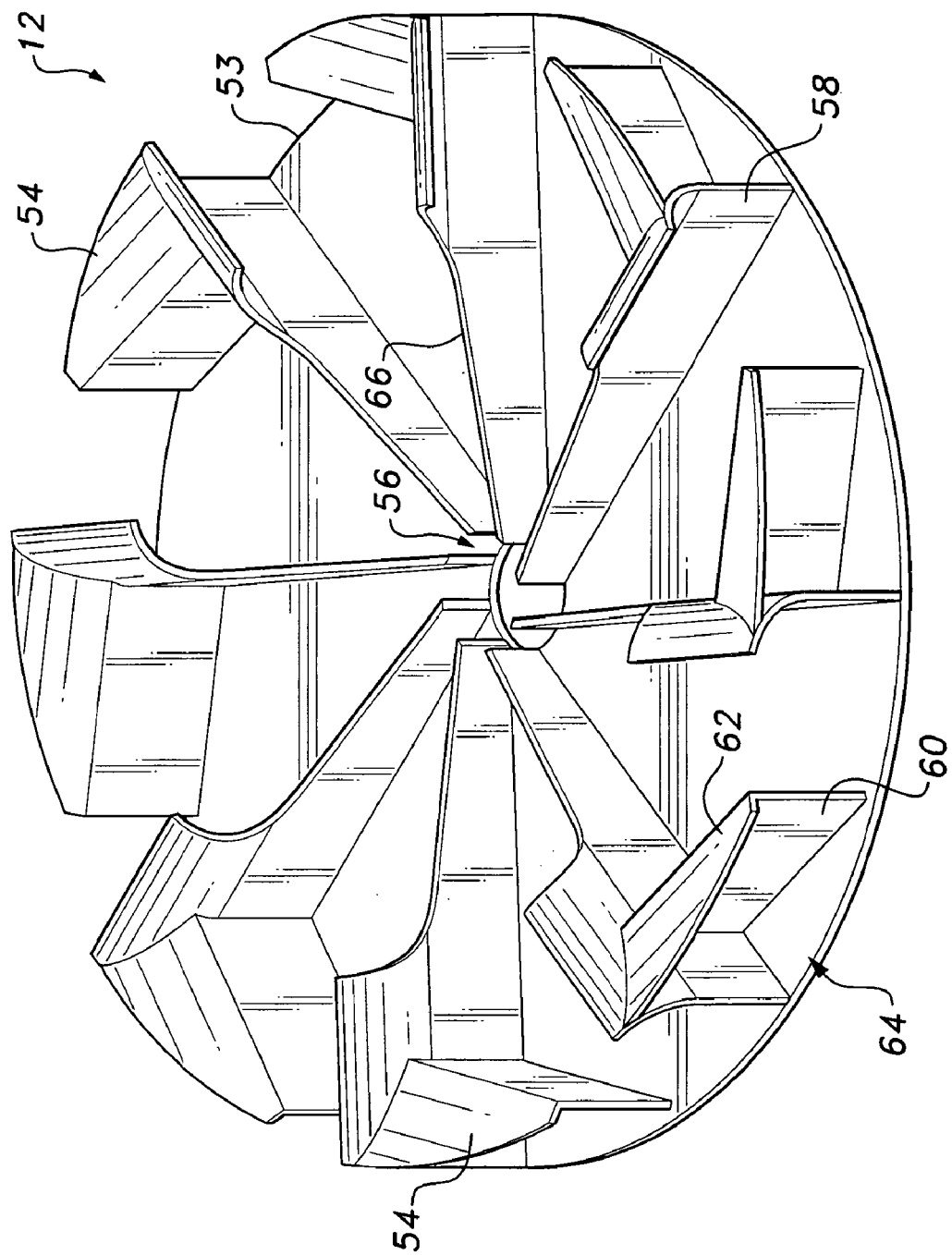
FIG. 2 is a perspective view of the main turbine of the wind turbine generator of FIG. 1.

As best shown in FIG. 2, the main turbine 12 is preferably modified from a conventional turbine, such as those used in jet engines and the like. The main turbine 12 includes a plurality of radially extending blades 54 mounted on a circular base 53. Each blade 54 includes a radially extending fin 58, each fin 58 having an inwardly slope, which is preferably arcuate. This sloping portion is generally indicated as 66 in FIG. 2. Each radially extending fin 58 has a circumferentially projecting extension fin 60 joined thereto, as shown, to form an outwardly facing chamber 64, covered by a cover member 62, as shown. The arcuate sloping of each cover member, coupled with the arcuate portions 66 of blades 54, acts to optimally drive the collected air, which is driven to turbine 12 by cover 14, into the central region 51 (shown in FIG. 1), and down through a central aperture 56 formed through base 53.

As opposed to a conventional windmill, for example, the blades 54 move in the direction of the wind flow, rather than against it. In a conventional turbine, each blade is typically taller toward the center (when viewed radially) and shorter near the peripheral edge. Due to the arcuate portions 66 of each blade 54, the central portion of each blade 54 is shorter near the center and taller near the circumferential edge. This increases the rate and volume of air that is being delivered through central aperture 56. In one full rotation, wind flow is directed a total of six times to the central aperture 56.

As shown in FIG. 1, the base 52 of main turbine 12 is mounted on a lower rotor 42, which includes a central air passage 43 for directing the downwardly driven air onto the blades of secondary turbine 40. Secondary turbine 40 may have any desired blade shape and is driven by the air delivered through passage 43 of rotor 42, and further by external wind, which enters the lower portion 26 of housing 24 via a side open cover 22 (similar to main open cover 14) and a side vent 20, as indicated by the directional arrows in FIG. 1.

Preferably, secondary turbine 40 is mounted within a chamber 45, 48, in which the secondary turbine 40 is suspended in a relatively viscous liquid, which acts both as a lubricant and also to stabilize the secondary turbine 40. Secondary turbine 40 rotates in a direction opposite that of main turbine 12, with lower rotor 42 of main turbine 12 being linked to, and further driven by, an upper rotor 44 of secondary turbine 40. Lower rotor 43 and upper rotor 44 may be linked by any suitable means of mechanical linkage, such as gears, belts or the like.

Preferably, main turbine 12 is mounted on bearings 46 or the like, to provide stability for main turbine 12, and rotation of main turbine 12 (driven by external wind and further enhanced through additional drive from secondary turbine 40) drives a generator 52 (via connection through a gearbox 50 or any other suitable linkage) to generate electricity, which may be stored in a battery 54 or which may be delivered to any suitable external electrical load. Any suitable type of electrical generator may be utilized such that driven mechanical rotation is converted into electrical energy.

Preferably, one or more solar panels 38 are mounted on an exterior surface of main open cover 14, with the solar panels 38 being used to produce electricity which may also be fed into battery 54, or which may be used to power controller 36 and anemometer 30.

It is to be understood that the present invention is not limited to the embodiments described above, but encompasses any and all embodiments within the scope of the following claims.

I claim:

1. A wind turbine generator system, comprising:

a housing having upper and lower portions, the upper portion having an opening formed therein, the upper portion defining an interior region, the lower portion having at least one vent formed therein;

a main open cover mounted on the upper portion of the housing, the main open cover being configured to direct environmental wind through the opening and into the interior region of the upper portion of the housing;

a main turbine rotatably mounted within the upper portion of the housing, the environmental wind directed by the main open cover driving rotation thereof, the main turbine having a central aperture formed therethrough, rotation of the main turbine driving air flow downwardly through the central aperture;

a secondary turbine rotatably mounted in the lower portion of the housing, the secondary turbine being driven to rotate by the downwardly driven air generated by the main turbine and by environmental wind entering through the at least one vent formed through the lower portion of the housing, the secondary turbine being mechanically linked to the main turbine to partially drive rotation thereof; and an electrical generator linked to the main turbine for generating electricity.

2. The wind turbine generator system as recited in claim 1, further comprising at least one auxiliary side open cover for directing additional environmental wind into the upper portion of said housing.

3. The wind turbine generator system as recited in claim 1, wherein the main open cover is rotatably mounted on the upper portion of said housing.

4. The wind turbine generator system as recited in claim 1, wherein said main turbine comprises:

a circular base; and a plurality of blades mounted radially on the circular base, each of the blades extending radially between the central aperture and a circumferential edge of the circular base.

5. The wind turbine generator system as recited in claim 4, wherein each said blade includes a radially extending fin and a circumferentially projecting fin joined to the radially extending fin adjacent the circumferential edge of the circular base.

6. The wind turbine generator system as recited in claim 5, wherein each said blade further comprises a cover member forming a circumferential chamber defined by the radially extending fin, the circumferentially projecting fin and the circumferential edge of the circular base.

7. The wind turbine generator as recited in claim 6, wherein each said radially extending fin has an inwardly directed sloping portion, the height of the radially extending fin adjacent the central aperture being smaller than the height of the radially extending fin adjacent the circumferential edge of the circular base.

8. The wind turbine generator as recited in claim 7, further comprising a lower rotor mounted to a lower surface of the circular base of the main turbine.

9. The wind turbine generator as recited in claim 8, further comprising an upper rotor mounted on the secondary turbine, the upper rotor partially driving rotation of the lower rotor.

10. The wind turbine generator as recited in claim 9, further comprising a battery in electrical communication with said electrical generator.

11. The wind turbine generator as recited in claim 10, wherein said secondary turbine is mounted within a chamber formed within the lower portion of said housing.

12. The wind turbine generator as recited in claim 11, wherein the secondary turbine is suspended in the chamber in a relatively viscous liquid.

13. The wind turbine generator as recited in claim 12, further comprising at least one bearing supporting the main turbine.

14. The wind turbine generator as recited in claim 13, further comprising at least one solar panel in electrical communication with the battery.

15. The wind turbine generator as recited in claim 14, wherein the at least one solar panel is mounted on the main open cover.

16. The wind turbine generator as recited in claim 15, further comprising means for rotating the main open cover responsive to measured wind direction.

17. The wind turbine generator as recited in claim 16, wherein said means for rotating the main open cover includes an anemometer for measuring wind direction.

18. The wind turbine generator as recited in claim 17, further comprising a wavelength antenna mounted on said housing.

19. The wind turbine generator as recited in claim 18, further comprising a stabilizing rudder mounted on said housing for selectively directing the environmental wind toward the main open cover.

20. A wind turbine generator system, comprising:

a housing having upper and lower portions;

a main open cover mounted on the upper portion of said housing, the main open cover being configured to direct environmental wind through an opening formed through the upper portion of said housing and into an interior region of the upper portion of said housing;

a main turbine rotatably mounted within the upper portion of said housing, the environmental wind directed by said main open cover driving rotation thereof, the main turbine having a central aperture formed therethrough, rotation of the main turbine driving air flow downwardly through the central aperture;

a lower rotor mounted to a lower surface of the main turbine, a central passage being formed through the lower rotor for directing airflow therethrough;

a secondary turbine rotatably mounted in the lower portion of said housing, the secondary turbine being driven to rotate by the downwardly driven air generated by the main turbine;

an upper rotor mounted on the secondary turbine, the upper rotor partially driving rotation of the lower rotor; and an electrical generator linked to said main turbine for generating electricity.

\* \* \* \* \*